Oct. 28, 1952 — C. M. YOUNG — 2,615,658

STABILIZATION SYSTEM IN AIRCRAFT AUTOPILOT

Filed July 17, 1948 — 2 SHEETS—SHEET 1

Inventor:
Charles M. Young,
by Claude A. Mill
His Attorney.

Oct. 28, 1952     C. M. YOUNG     2,615,658
STABILIZATION SYSTEM IN AIRCRAFT AUTOPILOT
Filed July 17, 1948     2 SHEETS—SHEET 2
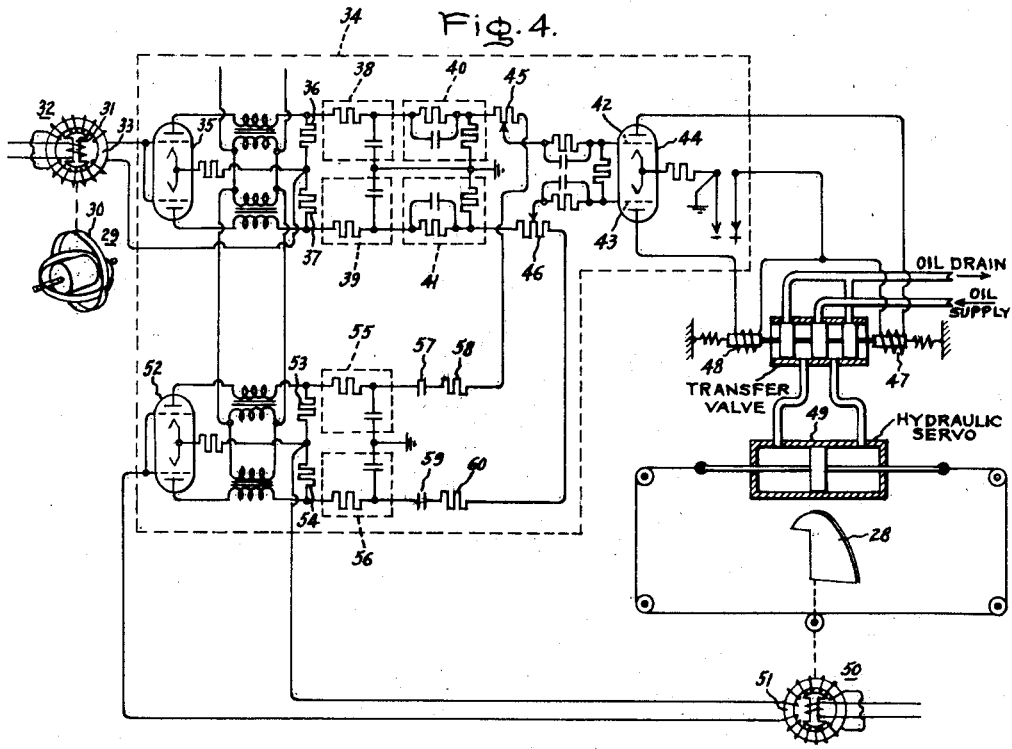
Inventor:
Charles M. Young,
by
His Attorney.

Patented Oct. 28, 1952

2,615,658

UNITED STATES PATENT OFFICE 2,615,658

STABILIZATION SYSTEM IN AIRCRAFT AUTOPILOT

Charles M. Young, Schenectady, N. Y., assignor to General Electric Company, a corporation of New York Application July 17, 1948, Serial No. 39,345

14 Claims. (Cl. 244—77)

1

The present invention relates to automatic control systems and, more particularly, to arrangements wherein a plurality of control signals are utilized to regulate servo apparatus automatically such that predetermined conditions are stably maintained.

Automatic regulation of many types of apparatus may be accomplished by servo systems coupled therewith and actuated in response to control signals delivered to these systems. The subject invention is directed to improved automatic regulation in the control systems wherein a plurality of control signals are utilized to actuate servo systems and, more specifically, wherein servo systems are actuated at least by a first control signal responsive to changes in a condition associated with the controlled apparatus and by a second control signal responsive to a condition associated with the servo system. In certain applications an additional control signal may be included, a reference signal, with which the first control signal may be compared.

Representative of an automatic regulation arrangement to which this invention may relate might be a temperature control system. In such a system the temperature of apparatus such as an enclosure, for example, may be indicated by the electrical output signal from a thermocouple and this first control signal may be compared with a reference electrical signal which represents the thermocouple output at the desired temperature of the enclosure. The difference voltages between these signals would be delivered to a servo system to actuate a servomotor and, thereby, actuate a device for heating the enclosure. Additionally, a follow-up or second control signal may be derived from the servomotor output and employed to control the servo amplifier in accordance with the setting of the heating device. This follow-up signal is derived such that no signal appears when the servomotor has an orientation which is predetermined for each particular value of temperature about which automatic control is desired. As will appear in detail hereinafter, the present invention eliminates the need for pre-setting or adjusting of the apparatus for producing these first or second control signals for various conditions of control, while other operating characteristics of such apparatus are preserved.

An important application of the subject invention for eliminating the pre-setting of control signal equipment is in autopiloting systems wherein such trim settings are often necessary

2 in the pick-off and follow-up equipment associated with gyro instruments and servomotor devices respectively.

Automatic piloting arrangements for craft such as aircraft may control the course or attitude of the aircraft by properly displacing the appropriate control surfaces in response to signals derived from instruments sensitive to movements of the aircraft. As is well known, for example, the rudder, ailerons or elevators may be automatically positioned by servo equipment to return an aircraft to desired conditions of flight when deviations therefrom are indicated by the equipment associated with the said instruments. Such instruments may comprise pendulums, compasses, altitude-responsive devices, or displacement or rate gyros.

In the basic autopilot system, any deviation of an aircraft about a control axis from a predetermined attitude results in an error signal output from the equipment associated with the corresponding attitude-reference instrument. This error signal, from a gyro instrument for example, may be proportional to the deviation and is delivered to a servo system. With respect to the aircraft yaw axis, specifically, the servo system would then control the displacement of the rudder control surface in accordance with error signal variations such that the craft would attempt to return to the proper attitude.

Practically, however, the speeds of various responses involved in influencing the behavior of a craft which is piloted automatically are such that there is a tendency for the off-course craft to excessively oscillate or hunt about the control axes rather than to return to them in substantially "dead beat" fashion. Aircraft oscillations about any control axis are substantially sinusoidal in nature, and consequently, the time delays of the various responses involved may be referred to the frequency of such oscillations. The delays most frequently encountered are: servomotor output position 90° lagging with respect to sinusoidal variations of input or error signals from attitude-maintaining instruments delivered to the servomotor; servomotor output additionally lagging up to 90° with respect to the input signal because of the inertia of the servomotor and the load coupled thereto; aircraft deviation from course 90° lagging with respect to the control surface motion; and additional aircraft lags up to 90° with respect to control surface motion due to inertia effects of the aircraft. The inertia lags in aircraft and servomotor are self-explanatory. With respect to the remaining lags, inherent in the servomotor and aircraft, these may be most easily envisioned with respect to an analysis of aircraft operation. When the rudder of an aircraft is moved sinusoidally from, for example, a maximum deflection back to a neutral position, the craft will continue to move in one direction of course and will not be deflected back toward the original course until the rudder actually moves in the opposite direction. That is, 90° sinusoidal movement of the rudder in the second quadrant of its complete cycle of movement results in 90° sinusoidal movement of the aircraft in the first quadrant of its cycle of movement, hence a 90° lag is realized. The response of the servomotor to a control signal may be similarly interpreted to explain the inherent lag. It is apparent then, that the fundamental autopilot system has an inherent phase lag of 180° in response, and that there may be additional inertia lags totalling 180° depending on the oscillation frequency, and hence accuracy, of the system.

If stable operation of an automatically piloted craft is to result, the hunting or oscillations of the craft must be positively damped by reducing the total response lags to less than 180°, otherwise the effects of the above phase lags are regenerative, and intolerable increases in the amplitude of craft oscillations are produced. "Dead beat," or non-oscillatory, operation of an automatically piloted craft obtains when the total response lags are 90° or less; consequently, a phase advance of from 90° to as much as 270° of the signal input to the servomotor may be required to achieve desired autopilot stability.

One object of the present invention therefore, is to provide an improved automatic regulating system which prevents hunting of the apparatus controlled thereby and which eliminates the effects of pre-setting, or trim, of control devices.

Another object is to provide an improved regulating system wherein the actuating or input signal to servo equipment is compensated such that the total response lags of the servo equipment and the regulated apparatus cannot act regeneratively to cause oscillation of the apparatus about a desired condition of control.

A further object is to provide an improved autopilot servo system with repeat-back signals which modify the input signals to a servo system to prevent hunting of a controlled craft.

Still further, it is an object to provide an autopilot servo system with control signals which do not include components due to steady state trim settings and which modify the input to the servo system to prevent excessive craft oscillations.

Additionally, an object is to provide an autopilot electrical repeat-back signal system wherein the substantially sinusoidally varying electrical signal output leads, up to 90°, the substantially sinusoidal movements of the associated control surface and wherein trim effects are eliminated.

These and other objects of this invention should become more fully understood from the following description of preferred embodiments of the invention taken in connection with the accompanying drawings, wherein:

Figure 4 represents in schematic and pictorial form a preferred arrangement of a stabilized autopilot; and Figure 5 depicts a partial autopilot system of the present invention including an alternative voltage feedback network.

Figure 1:
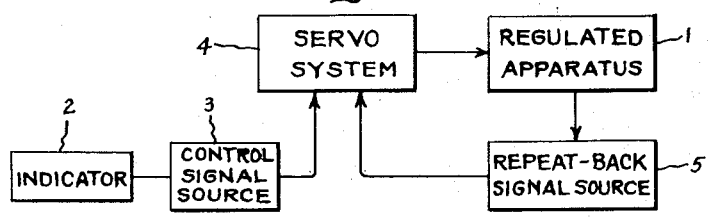
Figure 1 is a block diagram of a basic stabilized automatic regulating system embodying the subject invention.

The block diagram of Figure 1 exemplifies automatic regulating systems to which this invention is primarily directed. The regulated apparatus 1 may be any of numerous possible types, such as the temperature regulated enclosure or the aircraft control surface discussed hereinabove. An indicator 2 is associated with a control signal source 3 which delivers an output control signal to the servo system 4 in response to various indications appearing at indicator 2. Servo system 4 therefore controls the regulated apparatus 1 in accordance with these indications. In addition, a repeat back signal source 5 is coupled with the regulated apparatus 1 and servo system 4 such that the signal from source 3 is also modified by a repeat back signal. This repeat back or follow-up signal is obtained responsive to some variable condition associated with the operation of the regulated apparatus and is applied to the servo system with a 180° phase reversal which compensates for certain of the lags encountered in the regulating system. The present invention also makes possible the elimination of control signal errors due to pre-setting or trim-setting of the equipment from which the control signals are derived. Thus, the signals from sources 3 or 5 may be responsive only to variations in conditions associated with the equipment coupled thereto.

Figure 2:
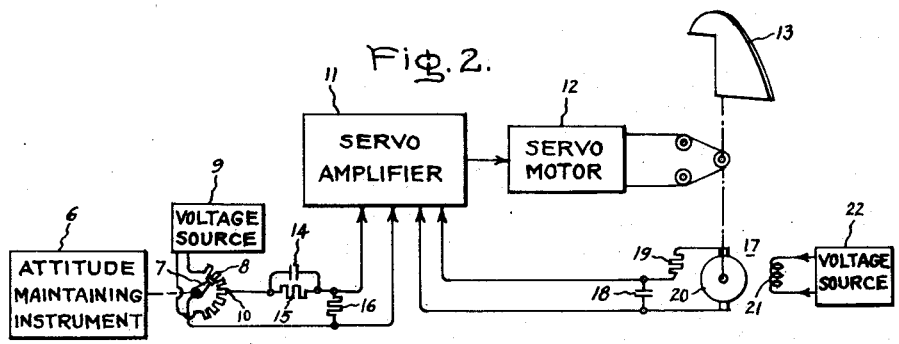
Figure 2 illustrates partially in block and partially in schematic form the essential components of the stabilized autopilot system in accordance with the present invention.

The foregoing features are included in the autopilot system diagrammed in Figure 2, wherein an attitude reference instrument mounted on an aircraft, such as, for example, the directional gyro controlled, direction-maintaining instrument 6, is adapted to mechanically rotate the wiping element 7 associated with the resistive member 8. Voltage source 9 establishes a voltage across resistance 8; and the wiper 7 and the fixed output tap 10 on this resistance are normally aligned such that no voltage difference appears therebetween when the craft is properly oriented in direction of flight. The servo amplifier 11 controlling the operation of a servomotor 12 and, therethrough, the rotation of the control surface means 13, illustrated as a rudder, function in substantially conventional fashion.

Stability of this system is achieved by modifying the input signal to the servo amplifier 11 such that there will be compensation for the lags, discussed heretofore, appearing when craft oscillation commences. Therefore, the error signals appearing between tap 10 and wiper arm 7 of resistance 8 are delivered to servo amplifier 11 through the resistance-reactance network comprised of the parallel combination of condenser 14 and resistance 15 and the shunt resistance 16. A differentiating-type or phase lead circuit is formed by the series combination of condenser 14 and resistance 16, and the component of output voltage across resistance 16 due to current through the condenser is proportional to the rate of change of the error signal. Additionally, a voltage proportional to the error signal appears across resistance 16 due to current flow through resistance 15 in parallel with the condenser. Under conditions which produce aircraft oscillations, the input signal voltage applied to the servo amplifier 11 from across resistance 16 therefore comprises a component proportional to the substantially sinusoidally varying error signal and a component of substantially sinusoidal voltage which leads the error signal in phase by up to 90°.

During hunting intervals, the control surface 13 is displaced from a neutral position by amounts which describe substantially sinusoidal variations with respect to a time axis, and, in accordance with this invention, such movements are utilized to produce repeat-back voltages which may be introduced as components of the servo amplifier input signals to compensate for external and internal response lags of the controlled craft and the autopilot system. One arrangement for accomplishing feedback of such voltages is illustrated in Figure 2 as comprising a D.-C. generator 17 which delivers its output voltage to a condenser 18 through a resistance 19, the condenser voltage being delivered to the input system of servo amplifier 11. In other words, the output of generator 17 is delivered to amplifier 11 through a phase shifting, resistance-reactance network. As indicated by the dashed lines in this figure, the generator armature 20 is mechanically rotated by the servomotor 12 which moves rudder 13, and the generator field winding 21 receives excitation from a voltage source 22.

When certain flight conditions produce rudder oscillation about a neutral position, the armature 20 is also caused to rotate in the field established by coil 21, and yields a substantially sinusoidal output voltage. Rapid hunting or oscillating produces a high frequency output voltage, and, as is characteristic of an R.-C. phase-shifting network when the capacitive reactance is small compared with the resistance, the voltage across the condenser will lag the generated voltage by 90°. However, since the generator, or tachometer, field is preferably polarized to cause the generator output voltage to lead the sinusoidal movements of the rudder by 90° the net effect is that the condenser output voltage is substantially of coincident phase with the movements of the control surface at high frequencies. Under conditions of low frequency rudder oscillations, the condenser output voltage is substantially in phase with the generator voltage due to the large capacitive reactance as compared with the resistance. The net effect at low frequencies of rudder oscillation is that the repeat-back or follow-up voltage delivered to the servo amplifier 11 from across the condenser 18 is 90° leading with respect to the sinusoidal movements of control surface 13.

When the time constant of the R.-C. circuit, including resistance 19 and condenser 18, is made large, for example, equal to the time constant of the craft, the phase lags due to the inertia effects of the aircraft will occur only at high oscillation frequencies not ordinarily encountered or never reached because of the degenerative effects of the feedback system at the lower frequencies which must be passed through before high frequencies of oscillation can be experienced.

Figure 3:
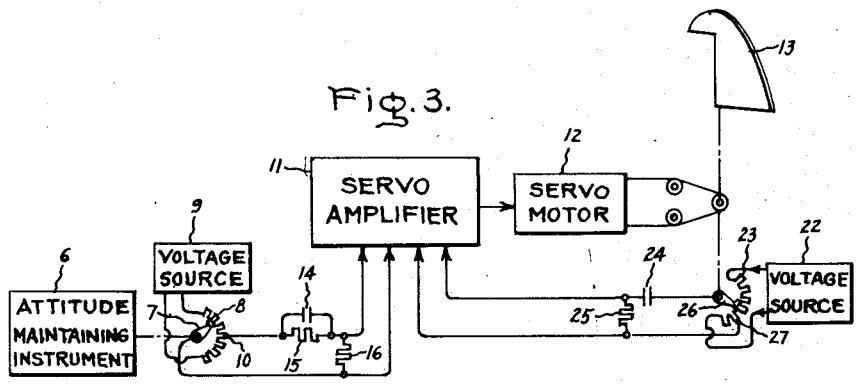
Figure 3 shows an alternate arrangement for obtaining a repeat-back voltage which may be utilized in the system of Figure 2.

The repeat-back or follow-up signals fed to the servo amplifier 11 in Figure 3 are obtained by an arrangement which differs in structure and mode of operation from that of Figure 2. However, certain autopilot components common to the two embodiments have been labelled in Figure 3 with the same numerals employed in Figure 2. Elements of this voltage feedback system include the voltage source 22, the fixed and variably tapped resistance 23, and the differentiating-type resistance-reactance network or circuit comprised of condenser 24 and resistance 25. The variable tap 26 on resistance 23 is caused to wipe across the latter responsive to movements of the control surface 13 to which it is mechanically coupled. This resistance 23, has a voltage established across its end terminals by the D.-C. voltage source 22 connected thereacross. Hence, the output signal taken from across the tap arm 26 and the tap point 27 will vary with movements of the control surface 13 and will have instantaneous values corresponding to instantaneous positions of the control surface. Provided the tap point 27 is coincident with the position of tap arm 26 on linear resistance 23 when the control surface 13 is in its neutral or trim-set positions, the voltage appearing between arm 26 and point 27 will have instantaneous values and polarities indicative of the instantaneous magnitudes and directions of control surface displacements. It will presently become apparent, however, that these precise resistance-tap conditions need not exist and that the fixed tap 27 may be at any point, say one end terminal, on resistance 23.

Whereas in the system of Figure 2 the voltage output from generator 17 was proportional to the speed of the control surface movements, the voltage output from the resistance 23 in Figure 3 is proportional to the control surface positions. Nevertheless, in the latter system, the series condenser 24 and shunt resistance 25 interposed in that order between the output from resistance 23 and the input to servo amplifier 11 permit the input to amplifier 11 to be substantially equivalent to that delivered to this amplifier in the system of Figure 2. At high frequencies of rudder oscillation, the effect of the capacitor 24 is small and the voltages appearing across resistance 25 will be substantially in phase with the voltage output from tapped resistance 23 and hence in phase with the rudder oscillations. Lower frequency sinusoidal motion of the control surface results in a voltage across resistance 25 which is 90° leading with respect to the voltage output tapped from resistance 23. This leading voltage is produced because at low frequencies the large capacitive reactance causes the circuit current through the condenser 24 and resistance 25 to lead the applied voltage by substantially 90°.

In place of the resistance-capacitance circuits employed in the feedback paths in Figures 2 and 3, resistance-inductance circuits may be substituted. Substantially equivalent phase shifting results may be obtained when, for example, in Figure 2 resistance 19 is replaced by an inductance and condenser 18 by a resistance. Similarly, in the arrangement of Figure 3, the condenser 24 may be replaced by a resistance and the resistance 25 by an inductance. It should thus be clear that the present invention is not limited by the phase shifting circuits which it has been chosen to illustrate in the drawings and that other apparatus performing in substantially the same manner may be employed.

In the arrangement of Figure 2, the tachometer delivers no output responsive to the rudder trim position, but merely responsive to motion of this control surface. The repeat-back signal producer of Figure 3 may exhibit a D. C. voltage in the output from resistance 23 when the rudder 13 is set for trim effects, however, condenser 24 prevents this from reaching amplifier 11. Thus, the signal repeat-back systems above described deliver anti-hunt signals to the servo amplifiers without introducing errors due to trim settings of the control surfaces. This has the advantage that no compensations need be made in the repeat-back circuit when the control surfaces are adjusted for different neutral positions, as in the case of rudder trim during an aircraft flight with unequal power outputs from the engines of a twin-engine craft.

When the potentiometer wiper arm 26 of potentiometer 23 in Figure 3 is moved from coincidence with tap 27 because of a trim setting of the control surface, a trim voltage appears between the tap and wiper arm. This trim voltage is blocked by condenser 24 and is therefore prevented from reaching the servo amplifier 11. Due to the leakage of most capacitors and other portions of most circuits, some very small trim voltages may of course appear at the servo amplifier. Their magnitudes are negligible, however, and the follow-up output voltages delivered to the servo amplifier are responsive substantially only to variations in the voltages from the follow-up potentiometer.

A preferred embodiment of the present invention is illustrated in Figure 4 wherein a control surface 28 is to be automatically actuated responsive to aircraft movements relative to a directional gyroscope 29 and wherein the desired repeat-back signals may be derived responsive to the control surface motion. Mechanically coupled to the outer gimbal 30 of the directional gyro 29 and rotatable therewith is the rotor 31 of the single-phase pick-off 32, the rotor coil being energized by an A.-C. voltage of, for example, 400 cycles. As is well known in autopilot art, the output voltage appearing between the output leads from the serially connected coils wound on the toroidal stator core 33 of this pick-off includes an A.-C. voltage component whose magnitude is proportional to the amount of deviation of the rotor from a neutral position and whose polarity with respect to a reference voltage depends on the angular direction of this deviation.

The servo amplifier system of the partial autopilot arrangement of Figure 4 is enclosed by the dashed lines and indicated by numeral 34. Signals from the gyro pick-off 32 are applied to the first-stage double-triode amplifier tube 35 between the parallel-connected control grids and one end of a cathode biasing resistor which at its other end is connected to the two cathodes. The plates of the two triode sections of tube 35 are each energized from one of the 400 cycle transformer secondary windings connected serially within each plate circuit and arranged to cause the plates to have opposite intantaneous polarities. The rectified voltage outputs from the triode section circuits appear as voltage drops across the plate load resistances 36 and 37. Resistance-capacity filters 38 and 39, each enclosed by dashed lines and each including a series resistance and shunt condenser, smooth out the 400 cycle components of the output voltages from plate load resistances 36 and 37, respectively such that the filter outputs are voltages which vary only responsive to variations in the position of rotor 31 of pick-off 32. The output voltages from filters 38 and 39 are delivered each to a resistance-reactance network enclosed by dashed lines and designated by numerals 40 and 41, respectively. Each of these networks corresponds in structure and function to the network of Figure 2 which comprises resistances 15 and 16 and condenser 14, and the voltage output from each network includes a component proportional to the rectified and filtered error signal from pick-off 32 and a component proportional to the rate of change of this error signal.

The output voltages from networks 40 and 41 are delivered to control grids 42 and 43 of a double-triode output tube 44 through the taps on resistances 45 and 46 respectively coupled to these networks. A D.-C. source supplies plate voltage to the two sections of tube 44; and the oil transfer value solenoids 47 and 48 are each included in one of the plate circuits. Hence, when the excitation voltages applied to control grids 42 and 43 vary inversely and responsive to movements of the pick-off rotor 31, the solenoids 47 and 48 are excited in different senses also, and, conventionally the control surface 28 is caused to move by action of the hydraulic servo 49.

Thus far analyzed, the system of Figure 4 provides a servo amplifier circuit which may actuate a servomotor in response to an error signal derived from a gyro pick-off and in response to a modified error signal shifted up to 90° leading with respect to the error signal. As hereinbefor discussed, the follow-up or repeat-back signal voltages should be modified such that trim effects are eliminated therefrom but that the follow-up voltages may be applied to the servo system when relatively high frequency movements of the control surface takes place. This is accomplished in the embodiment of Figure 4 by amplifying filtering, and differentiating the output of the 400 cycle pick-off unit 50 and then feeding the resultant signal to the servo amplifier stage including the output tube 44.

Pick-off unit 50 coupled to the control surface 28 may be similar to the gyro pick-off 32; and the serially connected stator coils wound on the toroidal stator core 51 produce an A.-C. output voltage whose magnitude is proportional to the amount of angular deviation of the pick-off rotor from a predetermined position and whose polarity depends on the angular direction of such deviations from this position. The A.-C. output voltages appearing in the output of unit 50 responsive to control surface movements are delivered to the double-triode tube 52 and applied thereto between the paralleled control grids and one end of a cathode resistance which at its other end is coupled to the cathodes of the dual triode. The two plates of the tube 52 are each energized from one of the 400 cycle transformer secondary windings connected serially within each plate circuit and arranged to cause these plates to have opposite instantaneous polarities. Hence, the alternating voltage outputs from the triode section circuits appear as voltage drops across the plate load resistances 53 and 54. The resistance-capacity filters 55 and 56, each enclosed by dashed lines and each including a series resistances and a shunt condenser to ground, smooth out the 400 cycle components of the output voltages from load resistances 53 and 54 respectively such that the filter output voltages vary only responsive to variations in the position of the control surface 28 and the rotor of pick-off 50. Output voltages from the filters are each differentiated, in accordance with aforedescribed practice, by resistance-capacitance filter networks. One such network comprises condenser 57 connected to the output of filter 55 and having serially associated with it to ground the resistance 58, tapped resistance 45, and the output resistance of network 40. Differentiator output voltage is obtained from the tap on resistance 45. Similarly, coupled to filter circuit 56 is the differentiator comprised of capacitance 59 and resistance 60, tapped resistance 46, and the output resistance of network 41.

Voltages tapped from across resistances 45 and 46 and coupled to the grids 42 and 43 of the servo amplifier output tube 44 each include three components: the error signal derived from a direction-maintaining instrument 29; a modified error signal shifted up to 90° leading with respect to the error signal; and a follow-up voltage advanced up to 90° leading with respect to substantially sinusoidal control surface motion. As previously discussed with respect to the differentiating circuit of Figure 3, the differentiating networks of Figure 4 produce follow-up output voltages which lead the applied voltages by up to 90° because at relatively low frequencies the large capacitive reactances of condensers 57 and 59 cause the circuit currents to lead the applied voltages by up to 90°. No trim effects are experienced in the A.-C. balanced system of Figure 4 since the A.-C. follow-up voltages delivered to dual-triode 52 are filtered by low pass networks 55 and 56 and then differentiated. These filters deliver output voltages which are of a constant D.-C. level when the control surface has trim settings displacing it from a neutral position; however, only the A.-C. variations due to control surface motion, that is, the desired follow-up voltages, are permitted to reach the servo output tube 44 through differentiator capacitances 57 and 59.

In certain autopilot applications wherein the range of speeds encountered by a craft through a medium are very great, as in high speed aircraft or missiles, feedback voltages produced responsive to another operating condition associated with the control surface means, for example, responsive to control surface forces rather than to positions, are desirable since the feedback signals will then be proportional to the torque in the craft regardless of its air speed. Figure 5 depicts such an autopilot system in which, for purposes of simplicity, only one function, for example, yaw, is shown to be automatically controlled. The error signal and phase-shifted error signal components delivered to the servo amplifier 61 in this figure are produced by the autopilot networks previously described with reference to Figures 2 and 3. Force feedback voltages responsive to forces on the control surface 62 may be derived from any suitable arrangements which will cause rotation of wiper arm 63 on resistance 64 in angular directions and to extents determined by the direction and magnitude of unbalanced forces acting upon this control surface. A voltage source 65 creates a voltage drop across resistance 64 and voltages tapped therefrom between wiper arm 63 and the fixed tap 66 are supplied to the differentiating-type resistance-reactance network comprised of series condenser 67 and shunt resistance 68. The phase-shifted output from the differentiating-type network is applied to servo amplifier 61 degeneratively with respect to the error signal also applied thereto.

The means for producing the desired rotation of resistance wiper arm 63 in Figure 5 is associated with the hydraulic servomotor utilized to actuate control surface 62. This hydraulic servomotor is represented partially by the block 69 and partially by the schematic showings connected therewith. Hydraulic motor 70 receives hydraulic fluid under pressure from servomotor unit 69 through connecting conduits 71, and piston 72 is operatively connected to rotate rudder control surface 62. The net force resulting from a difference of pressure on the two ends of piston 72 is balanced by the net force exerted upon rudder 62, hence the differential piston pressure is proportional to the resultant fluid pressure on the rudder. Differential pressure on piston 72 may be detected and employed to rotate wiper arm 63 by the differential pressure sensing element 73 coupled with conduits 71 through the conduits 74 and comprising a dual section enclosure divided by a flexible diaphragm 75. Each section of the sensing element is actuated by the fluid pressure in a separate one of conduits 74; and flexure of the diaphragm 75 due to unequal section pressures actuates the gear rack 76. Pinion gear 77 meshes with rack 76 and is rotated thereby in directions and to extents determined by diaphragm motion. Wiper arm 63 is rotated by pinion gear 77, and the voltage tapped from across resistance 64 by the displacement of this wiper arm is proportional to the pressure on the rudder surface.

Hydraulic motor 70 also has two tail lines 79 coupled thereto and to servomotor unit 69, and throttle valves 79 may be included in these lines to permit regulation of the stand-by pressure in the motor. It should, of course, be understood that the differential pressure sensing element 73 might be coupled to the servomotor in other positions with substantially equivalent results or, alternatively, that other means might be used to detect resultant control surface forces and employ these to produce the required mechanical movements. Additionally, A.-C. pick-off means such as those described with respect to the embodiment of Figure 4 may be utilized in place of the potentiometer type pick-off of Figure 5; and the balanced A.-C. system of Figure 4 may also be modified to include the force feedback features of Figure 5.

Although the subject autopilot system has for purposes of clarity been described with reference to an arrangement wherein only a single attitude reference device and a single follow-up device are employed to produce control signals, it is contemplated that other and additional equipment may be incorporated into the autopilot of this invention. In particular, it is intended that apparatus for accomplishing maneuvering may also apply maneuvering control signals to the autopilot servo amplifier. Likewise, in Figure 1, the indicator 2 and control signal source 3 may comprise equipment for accomplishing radio control of an aircraft, the indicator 2 being a radio receiver which in conjunction with source 3 produces an output of control signals variable in sense and magnitude responsive to the direction and extent of the deviation of the craft from a course established by a radio beam or beams.

It should be apparent, therefore, that there are numerous changes which could be made in the above-described constructions by those skilled in the art without departing either in spirit or scope from the present invention. Hence, it is intended that all matter contained in the foregoing description or shown in the accompanying drawings shall be interpreted as illustrative and not in a limiting sense.

What I claim as new and desire to secure by Letters Patent of the United States is:

1. In an automatic stabilizing system for a craft having a movable control surface for controlling the attitude of an axis of said craft relative to a desired attitude, a servomotor for actuating said control surface means, a servo amplifier system for controlling said servomotor in accordance with control signals applied to said amplifier system, means including an attitude reference instrument for producing a first control signal variable in polarity and magnitude in response to the direction and magnitude of deviations of said craft relative to said desired attitude, a resistance-reactance network utilizing said first control signal to produce a second control signal advanced in phase up to 90° leading with respect to said first control signal, means for producing a follow-up signal variable in polarity and magnitude in response to the direction and magnitude of the displacement of said control surface, a resistance-reactance network having a time constant substantially equal to the time constant of said craft and connected to utilize said follow-up signal to produce a third control signal advanced in phase by up to 90° with respect to the variations in the displacement of said control surface, said network being effective to substantially eliminate from said third control signal any components corresponding to the components in said follow-up signal which are responsive to trim settings of said control surface, and means for applying said control signals to said servo amplifier system such that said third control signal is introduced degeneratively with respect to said first and second control signals, whereby said craft is maintained in substantially fixed relationship to a desired attitude with substantially no hunting.

2. A system as set forth in claim 1, wherein the means for producing said follow-up signal comprises a resistance member, a voltage source coupled with said member to cause a voltage drop thereacross, a rotatable wiper and contact arm associated with said member and adapted to be actuated by said control surface means, and output coupling means connected to said rotatable arm and to a fixed voltage point, and the resistance-reactance network for producing said third control signal comprises a series capacitance and resistance connected across said output coupling means, said third control signal being tapped from across said resistance.

3. An autopilot stabilizing system for a craft having a movable control surface for controlling the attitude of an axis of said craft, comprising a servomotor for actuating said control surface, a servo amplifier system for controlling said servomotor in accordance with any control signals applied to said amplifier system, means including an attitude reference instrument for producing a first control signal variable in sense and magnitude in response to deviations of said craft relative to a desired attitude, a resistance-reactance network connected to utilize said first control signal to produce a second control signal advanced in phase up to 90° with respect to said first control signal, means for producing a follow-up signal variable in sense and magnitude in accordance with the sense and magnitude of a variable condition of operation of said control surface, a resistance-reactance network having a time constant substantially equal to the time constant of said craft and connected to utilize said first follow-up signal to produce a third follow-up signal advanced in phase up to 90° with respect to the variations of said condition of operation of said control surface, and means for applying said control signals to said servo amplifier system such that said third control signal is introduced degeneratively with respect to said first and second control signals, whereby said craft is maintained in substantially fixed relationship to a desired attitude with substantially no hunting.

4. A system as set forth in claim 3, wherein the means for producing said follow-up signal comprises a direct current generator, and means coupling the rotor of said generator to said control surface means for actuation thereby, and the resistance-reactance network for producing said third control signal comprises a series capacitance and resistance connected across the output of said generator, said third control signal being tapped from across said capacitance.

5. An automatic stabilizing system for a craft having a movable control surface for controlling the attitude of an axis of said craft, comprising a servomotor for actuating said control surface, a servo amplifier system for actuating said servomotor in accordance with any electrical control signals applied to said amplifier system, means including an attitude reference instrument for producing a first electrical control signal variable in polarity and magnitude in response to the direction and magnitude of the deviations of said craft relative to a desired attitude, a resistance-reactance network connected to utilize said first control signal to produce a second electrical control signal similar to said first signal and advanced in phase up to 90° leading with respect thereto, means for producing a follow-up signal variable in polarity and magnitude in response to the direction and magnitude of the resultant pressure on said control surface means, a resistance-reactance network having a time constant substantially equal to the time constant of said craft and connected to utilize said first follow-up signal to product a third electrical control signal advanced in phase by up to 90° with respect to the variations in said resultant pressure, and means for applying said control signals to said servo amplifier such that said third signal is introduced degeneratively with respect to said first and second control signals, whereby said craft is maintained in substantially fixed relationship to said desired attitude with substantially no hunting.

6. A system as set forth in claim 5, wherein said servomotor comprises a hydraulic servo system for actuating said control surface means, and said means for producing a follow-up signal comprises a device for producing electrical signals variable in response to variations in pressure differences between certain portions of said hydraulic servo system.

7. An automatic piloting arrangement for an aircraft having a movable control surface for controlling the attitude of an axis of said craft, comprising an attitude reference instrument for indicating the attitude of said craft axis relative to a desired attitude, alternating current pick-off means controlled by said instrument for producing output signals having electrical characteristics representative of the direction and magnitude of the displacement of said craft from said desired attitude, means for deriving from said output signals a first pair of control signals of opposite polarities and oppositely variable in polarity and magnitude in response to variations in said electrical characteristics of said output signals, a pair of resistance-reactance networks for deriving from said first pair of control signals a second pair of control signals each advanced in phase with respect to an associated one of said first control signals, alternating current pick-off means controlled by said control surface for producing follow-up signals having electrical characteristics representative of a variable condition of operation of said control surface, means for deriving from said follow-up signals a pair of repeat-back signals of opposite polarities and oppositely varying in polarity and magnitude in response to variations in said electrical characteristics of said follow-up signals, a pair of resistance-reactance networks having time constants substantially equal to the time constant of said craft and connected to utilize said pair of repeat-back signals to produce a third pair of control signals each advanced in phase with respect to an associated one of said pair of repeat-back signals, a servomotor for actuating said control surface means, and means responsive to said pairs of control signals for energizing said servomotor whereby said aircraft is maintained in the desired attitude with minimized hunting.

8. An autopilot arrangement in accordance with claim 7, wherein said means for producing follow-up signals is adapted to produce follow-up signals having electrical characteristics responsive to the direction and magnitude of the displacements of said control surface means from a neutral position, wherein said means for energizing said servomotor includes a pair of electrically controlled output means, and wherein said pairs of control signals are applied to said servomotor energizing means such that the input signal to each of said electrically controlled output means comprises an error signal, a second control signal advanced in phase with respect to said error signal, and a third control signal advanced in phase with respect to variations in the displacement of said control surface.

9. An automatic regulating system for a craft having a movable control surface for controlling the attitude of an axis of said craft, comprising a servomotor for actuating said control surface, means including an attitude reference instrument for producing an error signal in response to deviations of said craft axis relative to a desired attitude, means for producing a first follow-up signal variable in sense and magnitude in accordance with the sense and magnitude of a variable condition of operation of said control surface, a resistance-reactance network having a time constant at least as large as the time constant of said craft and connected to utilize said first follow-up signal to produce a second follow-up signal advanced in phase with respect to the variations in said condition of operation, and means responsive to said error signal and said second follow-up signal for energizing said servomotor.

10. An automatic regulating system for a craft having a movable control surface for controlling the attitude of an axis of said craft, comprising a servomotor for actuating said control surface, means including an attitude reference instrument for producing an error signal in response to deviations of said craft axis relative to a desired attitude, means for producing a first follow-up signal variable in sense and magnitude in response to the direction and magnitude of the displacement of said control surface from a neutral position, a resistance-reactance network having a time constant at least as large as the time constant of said craft and connected to utilize said first follow-up signal to produce a second follow-up signal advanced in phase with respect to the variations in said displacement of said control surface, and means responsive to said error signal and said second follow-up signal for energizing said servomotor.

11. An automatic stabilizing system for a craft having a movable control surface for controlling the attitude of an axis of said craft, comprising a servomotor for actuating said control surface, means including an attitude reference instrument for producing an error signal in response to deviations of said craft axis relative to a desired attitude, means for producing a first follow-up signal variable in sense and magnitude in response to the direction and rate of the displacement of said control surface, a resistance-reactance network having a time constant at least as large as the time constant of said craft and connected to utilize said first follow-up signal to produce a second follow-up signal advanced in phase with respect to the variations in said displacement of said control surface, and means responsive to said error signal and said second follow-up signal for energizing said servomotor.

12. An automatic stabilizing system for a craft having a movable control surface for controlling the attitude of an axis of said craft, comprising a servomotor for actuating said control surface, means including an attitude reference instrument for producing an error signal in response to deviations of said craft axis relative to a desired attitude, means for producing a first follow-up signal variable in sense and magnitude in response to the variations in the resultant pressures on said control surface, a resistance-reactance network having a time constant at least as large as the time constant of said craft and connected to utilize said first follow-up signal to produce a second follow-up signal advanced in phase with respect to the variations in said resultant pressures on said control surface, and means responsive to said error signal and said follow-up signal for energizing said servomotor.

13. An automatic stabilizing system for a craft having a movable control surface for controlling the attitude of an axis of said craft, comprising a servomotor for actuating said control surface, means including an attitude reference instrument for producing a first error signal in response to deviations of said craft axis relative to a desired attitude, a resistance-reactance network utilizing said first error signal to produce a second error signal advanced in phase with respect to said first error signal, means for producing a first follow-up signal variable in sense and magnitude in accordance with the sense and magnitude of a variable condition of operation of said control surface, and a resistance-reactance network having a time constant at least as large as the time constant of said craft and connected to utilize said first follow-up signal to produce a second follow-up signal advanced in phase with respect to the variations in said condition of operation, and means responsive to said first and second error signals and said second follow-up signal for energizing said servomotor.

14. An automatic stabilizing system for a craft having a movable control surface for controlling the attitude of an axis of said craft, comprising a servomotor for actuating said control surface, means including an attitude reference instrument for producing a first control signal in response to deviations of said craft axis relative to a desired attitude, a resistance-reactance network connected to utilize said first control signal to produce a second control signal similar to said first control signal and advanced in phase up to 90° with respect thereto, means for producing a follow-up signal variable in sense and magnitude in accordance with the sense and magnitude of a variable condition of operation of said control surface, a resistance-reactance network having a time constant substantially equal to the time constant of said craft and connected to utilize said follow-up signal to produce a third control signal similar to said follow-up signal and advanced in phase up to 90° with respect to the variations of said condition of operation of said control surface, and means responsive to said control signals for energizing said servomotor whereby said craft axis is maintained in substantially fixed relationship to said desired attitude with substantially no hunting.

CHARLES M. YOUNG.

REFERENCES CITED

The following references are of record in the file of this patent:

UNITED STATES PATENTS

| Number | Name | Date |
| --- | --- | --- |
| 2,376,599 | Jones | May 22, 1945 |
| 2,401,168 | Kronenberger | May 28, 1946 |
| 2,408,068 | Hull | Sept. 24, 1946 |
| 2,408,069 | Hull | Sept. 24, 1946 |
| 2,408,070 | Hull | Sept. 24, 1946 |
| 2,416,097 | Hansen | Feb. 18, 1947 |
| 2,470,099 | Hall | May 17, 1949 |